US008560514B2

(12) United States Patent
Liu

(10) Patent No.: US 8,560,514 B2

(45) **Date of Patent: *Oct. 15, 2013**

(54) ADAPTIVE ROUTING OF RESOURCE REQUESTS FOR MULTIPLE BACK-END SYSTEMS

(75) Inventor: Tse-Hsin Liu, Wellesley, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 290 days.

This patent is subject to a terminal disclaimer.

(21) Appl. No.: 12/902,870

(22) Filed: Oct. 12, 2010

(65) Prior Publication Data

US 2011/0029502 A1 Feb. 3, 2011

Related U.S. Application Data

(63) Continuation of application No. 11/613,588, filed on Dec. 20, 2006, now Pat. No. 7,836,042.

(51) Int. Cl.
*G06F 17/30* (2006.01)

(52) U.S. Cl.
USPC ........... 707/707; 707/682; 707/781; 707/795; 726/1; 726/2; 709/227; 709/228; 709/242

(58) Field of Classification Search
USPC .................. 707/707, 682, 781, 795; 726/1, 2; 709/227, 228, 242
See application file for complete search history.

(56) References Cited

U.S. PATENT DOCUMENTS

| | | | |
|---|---|---|---|
| 6,807,636 B2 | 10/2004 | Hartman et al. | |
| 7,388,869 B2 | 6/2008 | Butehorn et al. | |
| 7,921,225 B2 * | 4/2011 | Bonefas et al. | 709/238 |
| 8,266,675 B2 * | 9/2012 | Murakawa | 726/2 |
| 2001/0037358 A1 | 11/2001 | Clubb et al. | |
| 2003/0046589 A1 | 3/2003 | Gregg | |
| 2003/0056092 A1 | 3/2003 | Edgett et al. | |
| 2004/0210449 A1 | 10/2004 | Breck et al. | |
| 2005/0075115 A1 | 4/2005 | Corneille et al. | |
| 2005/0198099 A1 | 9/2005 | Motsinger et al. | |
| 2005/0278550 A1 | 12/2005 | Mahone et al. | |
| 2006/0271781 A1 * | 11/2006 | Murakawa | 713/168 |
| 2007/0083444 A1 | 4/2007 | Matthews et al. | |
| 2007/0206537 A1 * | 9/2007 | Cam-Winget et al. | 370/331 |
| 2008/0098111 A1 | 4/2008 | Montes de oca et al. | |
| 2008/0295144 A1 * | 11/2008 | Cam-Winget et al. | 726/1 |

* cited by examiner

*Primary Examiner* — Etienne LeRoux
*Assistant Examiner* — Cindy Nguyen

(57) ABSTRACT

A system receives a request from a client relating to an account associated with the client, and values associated with a set of parameters relating to the request. The system matches the values to a structure that includes cases of the set of parameters to determine one or more cases similar to the values associated with the set of parameters. The system accesses information for the account based on routing information corresponding to the determined one or more similar cases.

20 Claims, 7 Drawing Sheets

PORTAL SERVER
120
NETWORK
140
100
112
114
115
115
115
115
116
116
110
118

200
PROCESSOR
220
MAIN MEMORY
230
ROM
240
STORAGE DEVICE
250
BUS
210
INPUT DEVICE
260
OUTPUT DEVICE
270
COMMUNICATION INTERFACE
280

120
BACK-END SYSTEM
330-C
333
330-A
BACK-END SYSTEM
330-B
BACK-END SYSTEM
320
MIDDLEWARE COMPONENT
340
310
WEB SERVER
NETWORK
140

| 510 | 511 | 512 | 513 |
|---|---|---|---|
| CUSTOMER CODE | ACCOUNT STATE | SERVICE TYPE | TYPE OF BACK-END SYSTEM |
| 108 | ACTIVE | BTN | PROVISIONING |

600

| | 510 | 511 | 512 | 513 | 611 | 612 | 613 | 614 |
|---|---|---|---|---|---|---|---|---|
| | CUSTOMER CODE | ACCOUNT STATE | SERVICE TYPE | TYPE OF BACK-END SYSTEM | SUCCESS COUNTER | FAILURE COUNTER | P | ROUTING INFORMATION |
| 601-1 | 108 | ACTIVE | BTN | PROVISIONING | 2 | 0 | 0 | 192.168.15.200 API1 |
| 601-2 | 500 | ACTIVE | STN | BILLING | 0 | 8 | 1 | 192.168.10.100 API2 |
| | | | | ... | | | | |
| 601-N | 1000 | ACTIVE | BTN | PROVISIONING | 10 | 1 | 1 | 192.168.5.001 API3 |

ADAPTIVE ROUTING OF RESOURCE REQUESTS FOR MULTIPLE BACK-END SYSTEMS

RELATED APPLICATION

This application is a continuation of U.S. application Ser. No. 11/613,588, filed Dec. 20, 2006, the disclosure of which is incorporated herein by reference.

BACKGROUND INFORMATION

Companies that provide services to customers frequently provide their customers with automated techniques for viewing and/or managing accounts relating to these services. A service company may, for instance, manage a web site designed to allow its customers to login to the web site and view and/or modify information specific to account(s) maintained with the company.

As an example of such a web site, consider a web portal provided by a telecommunication company for its clients. The telecommunication company may operate a variety of back-end systems and networks, such as legacy systems or networks, which were acquired over the years. A particular customer may have a number of different accounts with the company. For example, a customer may be a large corporation with many divisions, each of which may maintain a different account, such as a different long distance or data service account, with the company. Employees in various divisions may be given different access privileges to the various accounts.

The web portal, when providing access to customer service records relating to the various accounts, may request information from the back-end system(s) that contain the requested information. In some situations, there may be numerous back-end systems that may potentially contain the customer information. The status of the back-end systems may be constantly changing. For example, a legacy back-end billing system may be in the process of being phased-out and accounts on this back-end system may be in the process of being migrated to another back-end system. Keeping track of all the back-end systems, and more particularly, determining which back-end systems the web portal needs to access for a particular request can be a difficult task.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Techniques described herein may determine routing information used in accessing a back-end system appropriate to handle a customer account request. The routing information may be determined by matching parameter values associated with the account request to a list of cases that each correspond to a set of parameter values from a previous request. The cases in the list may be dynamically added or deleted based on whether the determined routing information was correct. The cases in the list may thus define a knowledge base that changes to match the changing topology of the back-end systems.

Figure 1:
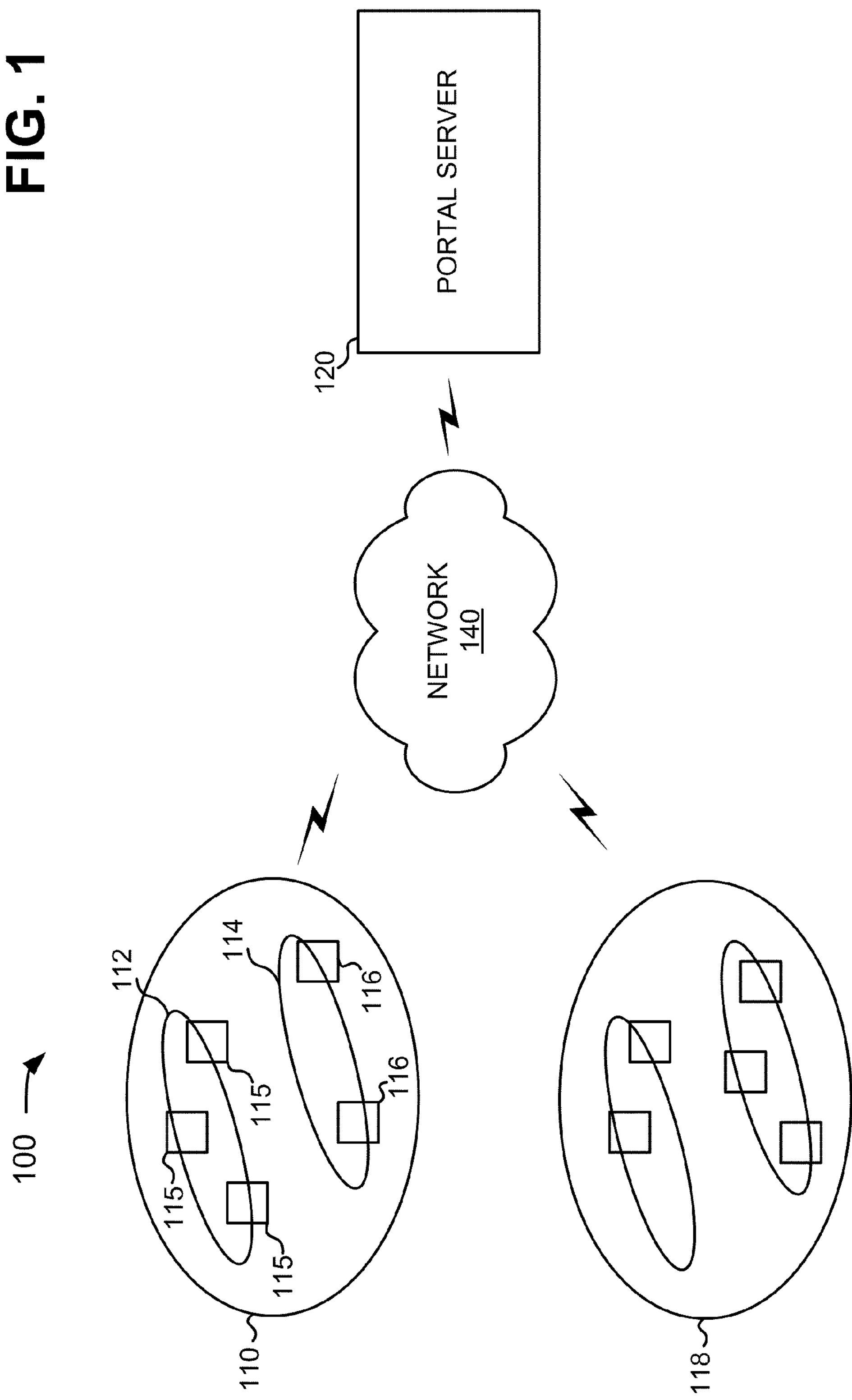
FIG. 1 is a diagram of an exemplary system in which techniques described herein may be implemented.

FIG. 1 depicts an exemplary system 100 in which techniques described herein may be implemented. System 100 may include entities 110 and 118 that connect to a portal server 120 via a network 140. In one implementation, entities 110 and 118 may correspond to customers that wish to access or modify account information provided by portal server 120. A customer may be, for example, a corporation that purchases services from a company associated with portal server 120.

Entities 110 and 118 may include a number of groups or divisions that may each be given different access privileges to portal server 120. For example, entity 110 may be a corporation that includes a number of sections or divisions, such as an accounting section, a customer service section, etc. Various ones of these sections may be associated with different accounts or may have different account access privileges associated with the services offered by the company associated with portal server 120. As shown in FIG. 1, for example, entity 110 may include a first division 112 and a second division 114, which may each include client computing devices, such as clients 115 and 116, respectively. Users of clients 115 in division 112 may have different access privileges to the various accounts of entity 110 than users of clients 116 in division 114.

The number of clients, servers, and entities shown in FIG. 1 are exemplary. In practice, there may be more or fewer clients, servers, or entities.

Network 140 may include a local area network (LAN), a wide area network (WAN), a telephone network, such as the Public Switched Telephone Network (PSTN), an intranet, the Internet, or a combination of networks. Clients 115/116 of entity 110, clients of entity 118, and portal server 120 may connect to network 140 via wired, wireless, and/or optical connections. Each of clients 115/116 may additionally include a web browser (not shown) for accessing and interacting with web sites. Users of clients 115/116 may, for example, use the web browser to interact with portal server 120.

Clients 115/116 may include a device, such as a personal computer, a wireless telephone, a personal digital assistant (PDA), a lap top, or another type of computation or communication device, a thread or process running on one of these devices, and/or an object executable by one of these devices. Portal server 120 may include computing devices and/or software that provide clients 115/116 with access to accounts provided by an entity associated with portal server 120. For example, if the entity associated with portal server 120 is a telecommunications company, portal server 120 may allow customers of the telecommunications company to view and modify information associated with various accounts of the customer with the telecommunications company. Portal server 120 may include a front-end web server for interacting with clients 115/116 and various back-end components that implement or provide information relating to services used by the customer. Portal server 120 will be described in more detail below.

Figure 2:
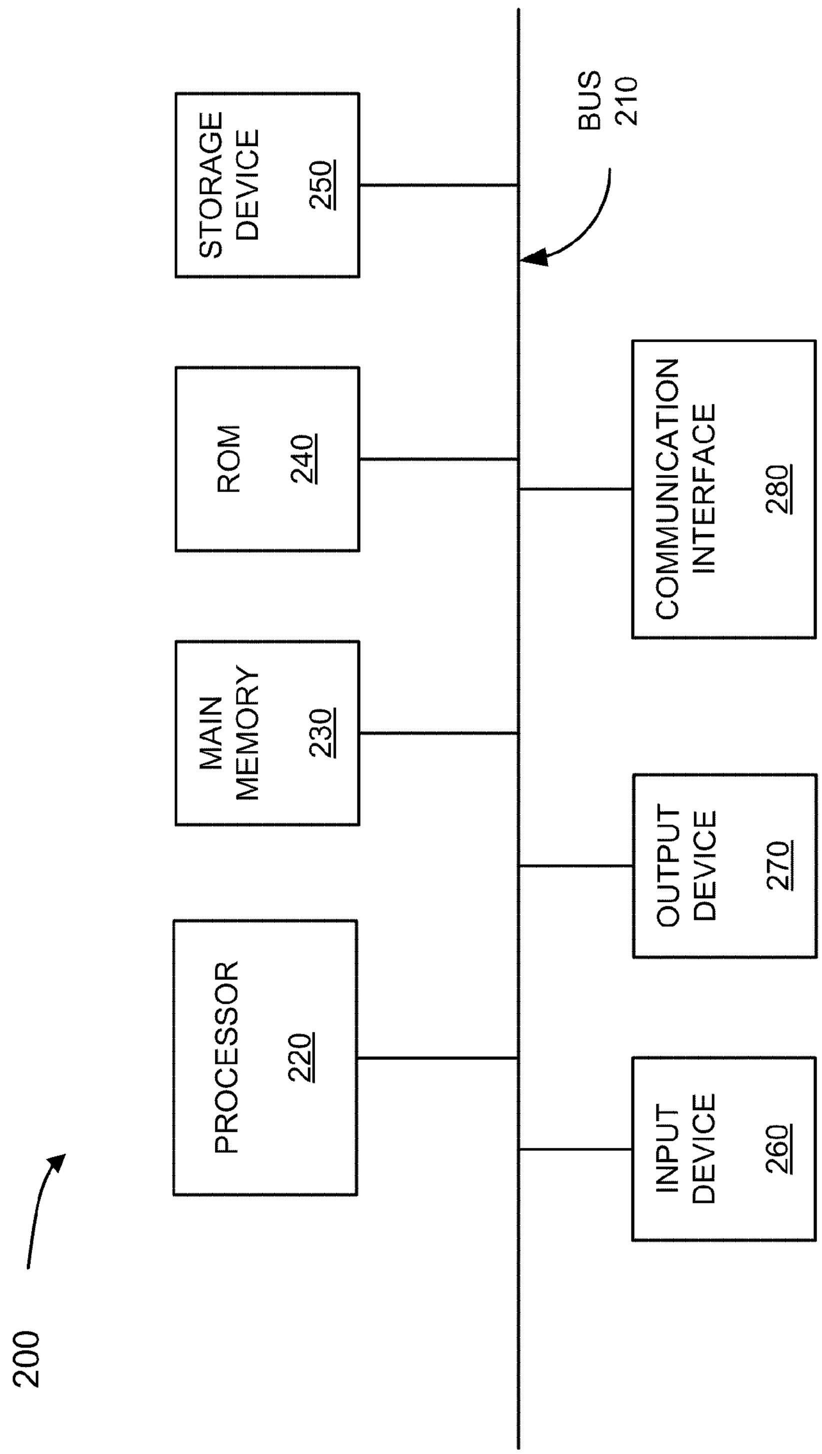
FIG. 2 is an exemplary diagram of a computing device that may correspond to a client or a device included in a portal server shown in FIG. 1.

FIG. 2 is an exemplary diagram of a computing device 200 that may correspond to a client (e.g., clients 115/116) or a computing device included in portal server 120. Computing device 200 may include a bus 210, a processor 220, a main memory 230, a read only memory (ROM) 240, a storage device 250, an input device 260, an output device 270, and a communication interface 280. Bus 210 may include a path that permits communication among the elements of the computing device.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information into computing device 200, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables computing device 200 to communicate with other devices and/or systems. For example, communication interface 280 may include mechanisms for communicating with another device or system via a network, such as network 140.

Computing device 200 may perform operations in response to processor 220 executing software instructions contained in a computer-readable medium, such as memory 230. A computer-readable medium may be defined as a physical or logical memory device.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Figure 3:
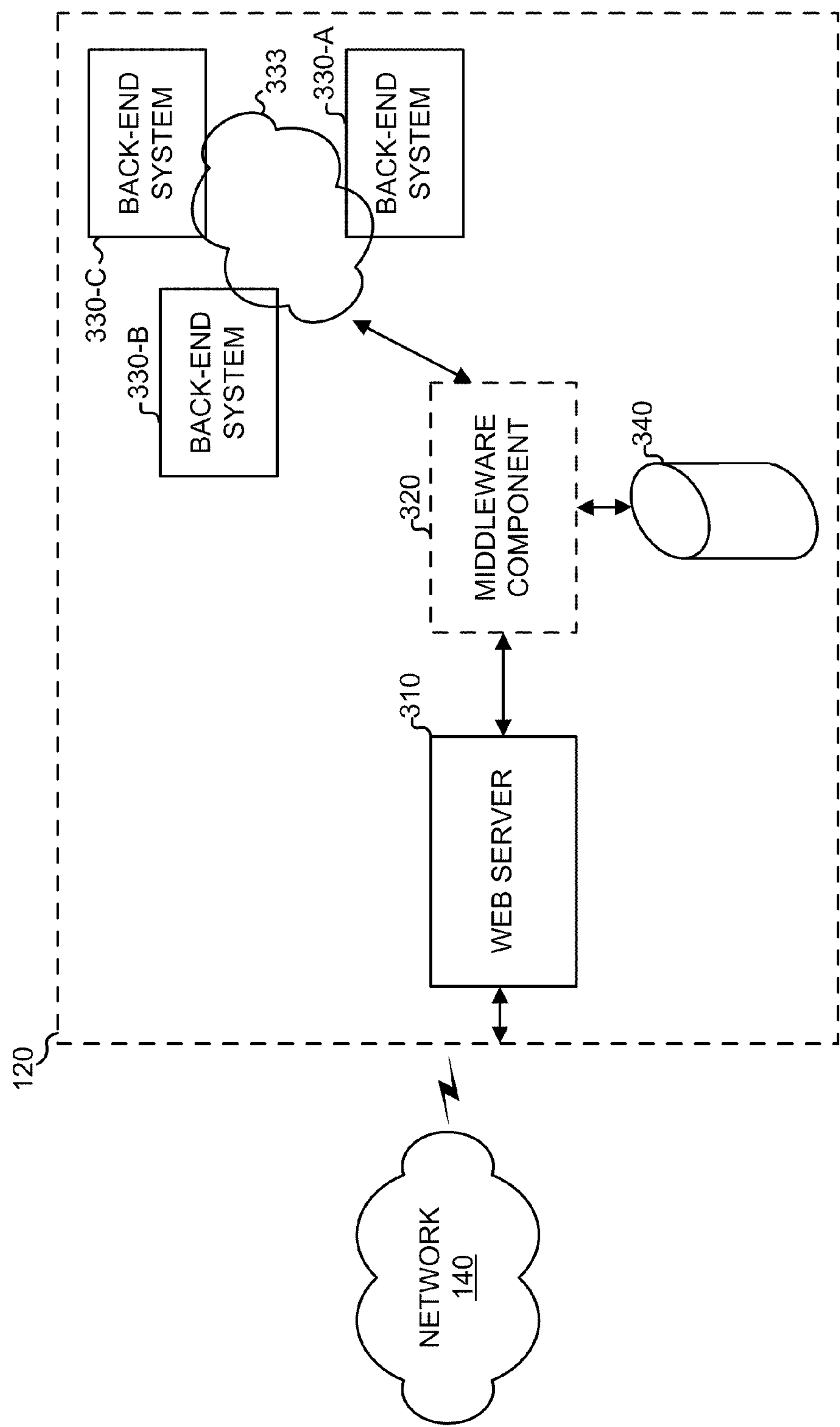
FIG. 3 is a diagram illustrating an exemplary implementation of the portal server shown in FIG. 1.

FIG. 3 is a diagram illustrating an exemplary implementation of portal server 120. As shown, portal server 120 may include a web server 310, a middleware component 320, back-end systems 330-A through 330-C (collectively referred to as back-end systems 330), and a routing information structure 340. Additionally, a network 333 may connect back-end systems 330 to one another and to middleware component 320.

In general, web server 310 may interact with clients (e.g., clients 115/116) that are connecting to portal server 120 by providing, for example, hyper-text markup language (HTML) documents (i.e., web pages) that contain information requested by the connecting client 115/116. Web server 310 may dynamically generate web pages by accessing middleware component 320, which may further access back-end systems 330 and routing information structure 340 to obtain the information necessary to respond to a request from clients 115/116.

Web server 310 may include one or more software components and computing devices, such as computing device 200, that implements a web server for clients 115/116. Web server 310 may dynamically generate web pages for each client accessing web server 310. In particular, web server 310 may transmit HTML documents and script to clients 115/116 that include information relating to customer accounts. Although shown as a single "block" in FIG. 3, web server 310 may be implemented as one or more distributed or clustered computing devices.

Middleware component 320 may act as a middle layer between web server 310 and back-end systems 330. Middleware component 320 may be implemented using one or more computing devices, such as computing device 200, which may be implemented in a distributed or scaleable manner. Middleware component 320 may generally, in response to a request from web server 310, retrieve account information from back-end systems 330 and return the information to web server 310.

Middleware component 320 may be an optional component. That is, in some implementations, middleware component 320 may not be used and web server 310 may additionally perform the functions of middleware component. Further, although shown as a single "block" in FIG. 3, middleware component 320 may be implemented as one or more distributed or clustered computing devices.

Back-end systems 330 may include one or more systems that provide or administer the services that are to be managed via portal server 120. For example, in the context of the telecommunications industry, back-end systems 330 may include router devices, billing systems, order placement systems, repair systems, provisioning systems, engineering systems, or devices for managing such systems. Some of back-end systems 330 may be legacy systems that perform functions similar to newer, non-legacy, versions of the back-end systems. Various ones of back-end systems 330 may be geographically dispersed. For example, a company may have a large number of billing systems, one of which may be implemented, e.g., by a main frame on the East coast, while a second billing system may be implemented, e.g., by a cluster of computers on the West coast. Additionally, accounts maintained by the various back-end systems may be subject to change at any time. For example, the main frame on the East coast may be a legacy system that is in the process of being deactivated by gradually moving groups of the accounts to the second billing system on the West coast. Accordingly, at any given time, accounts hosted by back-end systems 330 may be considered to be in a constant state of change.

Routing information structure 340 may store parameter values associated with account requests from a client (e.g., one of clients 115/116). When requesting information relating to an account, a number of parameters may be used to define the account request. The parameters may, for instance, define a customer code, an account number, a status of the account, a service type of the account, the type of back-end system, etc. Routing information structure 340 may store a list of parameter values corresponding to actual requests for back-end systems 330. For each set of parameter values, routing information structure 340 may also store routing information defining the logical location of the back-end system that handled the request. The routing information may be, for example, a link, a network address, or another type of resource identifier that identifies the back-end system that handled the request.

Routing information structure 340 may be implemented as, for example, a relational or non-relational database capable of storing and accessing data. Routing information structure 340 may be implemented on a single computing device or distributed across many computing devices and/or storage devices. In some alternate implementations, routing information structure 340 may be implemented as a simple "flat" file or other similar structure.

Figure 4:
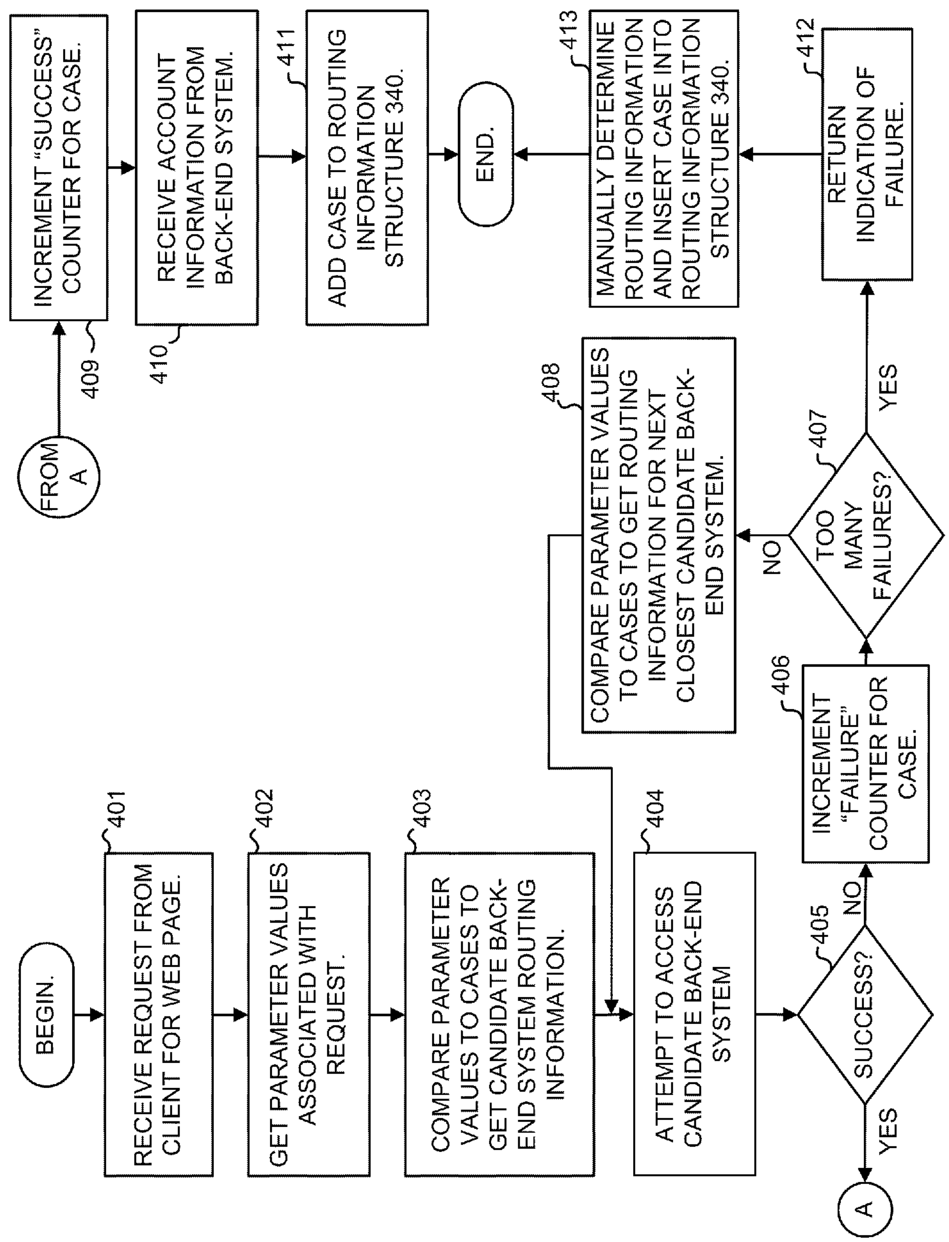
FIG. 4 is a flow chart illustrating exemplary operations performed by the portal server.

The operation of portal server 120 will next be described with reference to FIG. 4. FIG. 4 is a flow chart illustrating exemplary operations that may be performed by portal server 120.

To begin, portal server 120 may receive a request from a client (e.g., one of clients 115/116) for a web page (act 401). The request may be received by web server 310. In some implementations, web server 310 may require the client to login or otherwise authenticate a session with web server 310. In this manner, web server 310 may identify the user and may use the user's identity to determine the access permissions or accounts the user should be allowed to view and/or modify. As discussed previously, the web page requested by client 115/116 may be a web page that provides information relating to account(s) of client 115/116.

Web server 310 may forward the request to middleware component 320 which may then get or generate parameter values associated with the request (act 402). In implementations in which middleware component 320 is not used, web server 310 may get or generate parameters associated with the request.

Figures 5, 6:
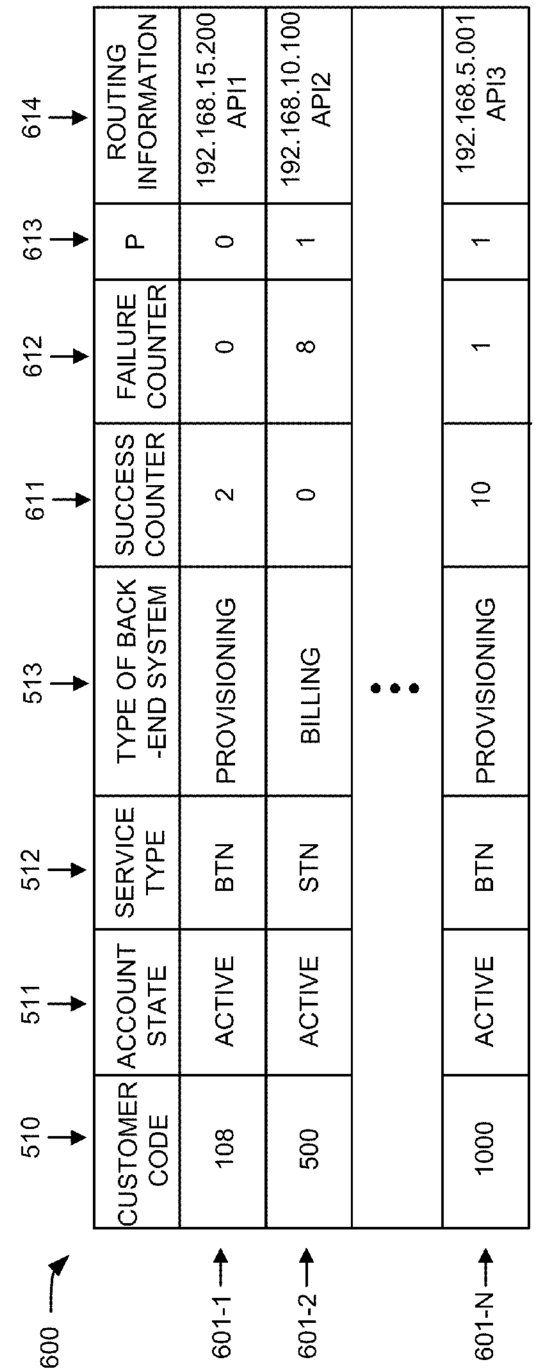
FIG. 5 is a diagram illustrating an exemplary set of parameter values.
FIG. 6 is a diagram illustrating an exemplary portion of a routing information structure shown in FIG. 3.

FIG. 5 is a diagram illustrating an exemplary set of parameter values generated in act 402. Four parameters are shown in FIG. 5, including a customer code 510, an account state 511, a service type 512, and a type of back-end system 513. Each of parameters 510-513 may be associated with a value based on the particular account request and/or the requesting client 115/116. In this example, customer code parameter 510 has the value of "108," account state parameter 511 has a value of "ACTIVE", service type parameter 512 has a value of "BTN," and type of back-end system parameter 513 has a value of "PROVISIONING."

Four parameters are shown for explanation clarity. It can be appreciated that an actual implementation may include any number of parameters.

As previously mentioned, routing information structure 340 may store parameter values associated with prior requests from users. FIG. 6 is a diagram illustrating an exemplary portion of routing information structure 340. In this example, routing information structure 340 is a table 600 including a number of entries, where each entry includes a vector of values for parameters 510-513, a success counter value 611, a failure counter value 612, a priority value 613, and a corresponding routing information value 614. Each row (entry) in table 600 may be a prior actual set of parameter values and a routing information value, and will be referred to herein as a "case." The cases in table 600 are labeled as cases 601-1 through 601-N. For each case 601-1 through 601-N, routing information column 614 may define the back-end system that was eventually determined for the request. For example, the request corresponding to case 601-1 was eventually satisfied by the back-end system identified by the IP address "192.168.15.200" and accessed using the application program interface (API) called "API1." API1 may refer to the type of logical interface used to access the back-end system. In this example, the IP address and API identifier together the information needed to appropriately access the back-end system. Although IP addresses are shown in the example of table 600, it can be appreciated that other techniques for locating or routing information to a resource could be used.

Success counter value 611 may be used to keep track of how many times each case in table 600 resulted in a successful access and failure counter value 612 may be used to keep track of how many times each case in table 600 resulted in a failure. The use of success counter value 611 and failure counter value 612 will be described in more detail below.

Priority value 613 may refer to a priority or level or preference of the back-end system referred to by the corresponding routing information 614. For example, consider the situation in which a legacy back-end system is being gradually taken off-line but, for some period of time, still operates in parallel with the new back-end system. During this period of time, the legacy system may still be accessed, although the new system should be accessed first when possible. In the example of FIG. 6, lower numbers indicate higher priority. Case 601-1, for instance, has a priority value of zero, which may mean that the routing information for this case refers to the primary back-end system. Cases 601-2 and 601-N have a priority value of one, which may mean that the routing information for this case may refer to lower preference back-end systems.

Referring back to FIG. 4, the parameter values associated with the current request may be compared to previous cases (act 403). For example, the parameter values associated with the current request may be compared to cases 601-1 through 601-N from table 600 to determine the case that most closely matches the current parameter values. The routing information stored in table 600 for the most closely matching case may thus be determined. In some implementations, the number of successful prior uses of the case, as stored in success counter value 611, and the number of failed prior uses of the case, as stored in failure counter value 612, may also be taken into consideration when determining the case that most closely matches the current parameter values.

Figure 7:
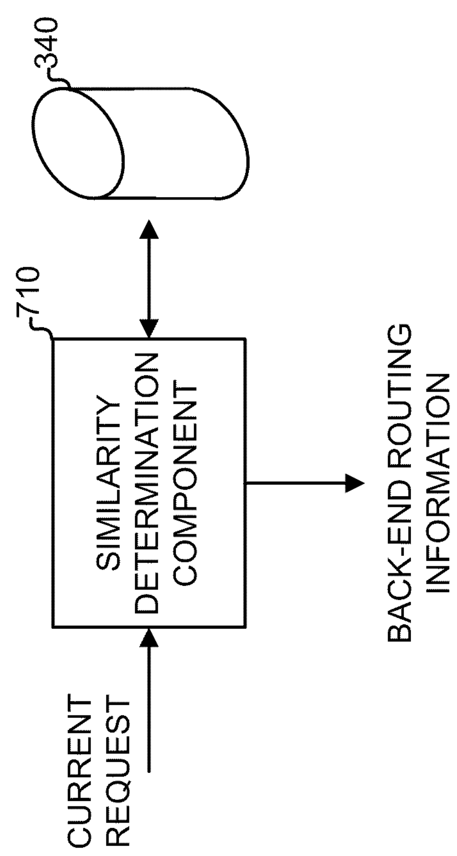
FIG. 7 is a diagram conceptually illustrating a comparison of a set of parameter values.

FIG. 7 is a diagram conceptually illustrating the comparison performed in act 403. A similarity detection component 710 may receive the parameter values associated with the current request, such as the values shown in FIG. 5. Similarity detection component 710 may access routing information structure 340 and may compare the parameter values associated with the current request to each of the cases stored in routing information structure 340. In general, the comparison performed by similarity detection component 710 may be a pattern matching operation in which similarity detection component 710 attempts to determine the closest matching case. Numerous different pattern matching techniques are known in the art and could be used. For example, in one possible implementation, similarity detection component 710 may compare each of the corresponding parameter values and generate a "1" if the parameter values are an exact match and a "0" otherwise. Similarity detection component 710 may then sum the "1" values to obtain a final value that can be used as a metric of similarity.

In addition to how closely the parameter values associated with the current request match each of the cases stored in routing information structure 340, similarity detection component 710 may also take into account success counter value 611 and failure counter value 612. For example, if the success count is high relative to the failure count, such as in cases 601-1 or 601-N, similarity detection component 710 may bias the matching so that cases with relatively high success values tend to be chosen more often. Conversely, similarity detection component 710 may negatively bias the matching of cases that have a high failure value relative to their success value.

Further, in some implementations, similarity detection component 710 may also take into account priority value 613 when determining a matching case. For example, higher priority back-end systems may be given preference over lower priority back-end systems.

The routing information corresponding to the most similar case, potentially as additionally influenced by success counter value 611, failure counter value 612, and priority value 613, may be output by similarity detection component 710. The output routing information may identify the candidate back-end system, i.e., the back-end system estimated to be appropriate to handle the request.

In some implementations, similarity detection component 710 may be implemented in web server 310 while in other implementations it may be implemented in middleware component 320.

The routing information from act 403 may next be used to attempt to access the candidate back-end system (act 404). If the access attempt is a success, that is, if the back-end system identified by the routing information returns appropriate account information in response to the request, the account information may be received (acts 405 and 410) and the corresponding success counter value 611 may be incremented (act 409). The account information may then be used, for example, by web server 310 to generate the web page requested by client 115/116.

The new case defined by the received parameter values and the correct back-end system routing information may be entered in routing information structure 340 (act 411). In some implementations, whether to enter the new case into routing information structure 340 may be determined based on whether entering the new case increases the effectiveness of routing information structure 340. For example, if the new case is identical to a case already in routing information structure 340, the new case may be determined to be redundant to the information already in routing information structure 340 and may not be entered.

If, however, the routing information fails in contacting the appropriate back-end system, the routing information for additional similar cases may be used to attempt contact with a back-end system until the appropriate back-end system is accessed. More specifically, referring to act 405, if the initial routing information fails in contacting the appropriate back-end system, the corresponding failure counter value 612 may be incremented (act 406) and a check may be made to determine how many times the routing information for the request has failed (acts 407 and 408). In one implementation, a predetermined number of failures (e.g., five) may be allowed before the system gives up. If there are currently less failures than this predetermined number, the current parameter values may again be compared to the cases in routing information structure 340 by similarity determination component 710 to determine the next most similar case (act 408). In some implementations, instead of actually re-performing the comparison by similarity determination 710, the initial comparison by similarity determination component 710 may return a list of similar cases that are ordered by similarity. In this situation, act 407 may simply correspond to selection of the next most similar case from the list. The next most similar case may then be used to attempt to access the back-end system indicated by the routing information corresponding to the next most similar case (act 404).

If the middleware component 320 is unable to connect to the appropriate back-end system, such as indicated by the occurrence of greater than the predetermined number of failures, an indication of failure may be returned (acts 407 and 412). The web page that may be sent to client 115/116 may include a message stating that a temporary error has occurred and the client account request could not be fulfilled. The error may be logged or sent directly to an administrator. At some point, an administrator may manually research the issue to determine the correct routing information for the client (act 413). The routing information along with the customer parameter values may then be inserted as a new case into routing information structure 340 (act 413). In this manner, future requests for a similar set of parameter values may result in the correct determination of the routing information for the appropriate back-end system.

When initially filling-in routing information structure 340, an initial set of cases for routing information structure 340 may be determined in a number of ways. For example, an initial set of hard-coded rules may be used to generate the cases for routing information structure 340 and/or administrators may manually research customer requests to build up a set of cases for routing information structure 340.

In some implementations, table 600 may be periodically purged or filtered to remove cases that tend to not be contributing to successful matches. For instance, cases in which failure counter value 612 is too large relative to success counter value 611 may be purged.

Figure 8:
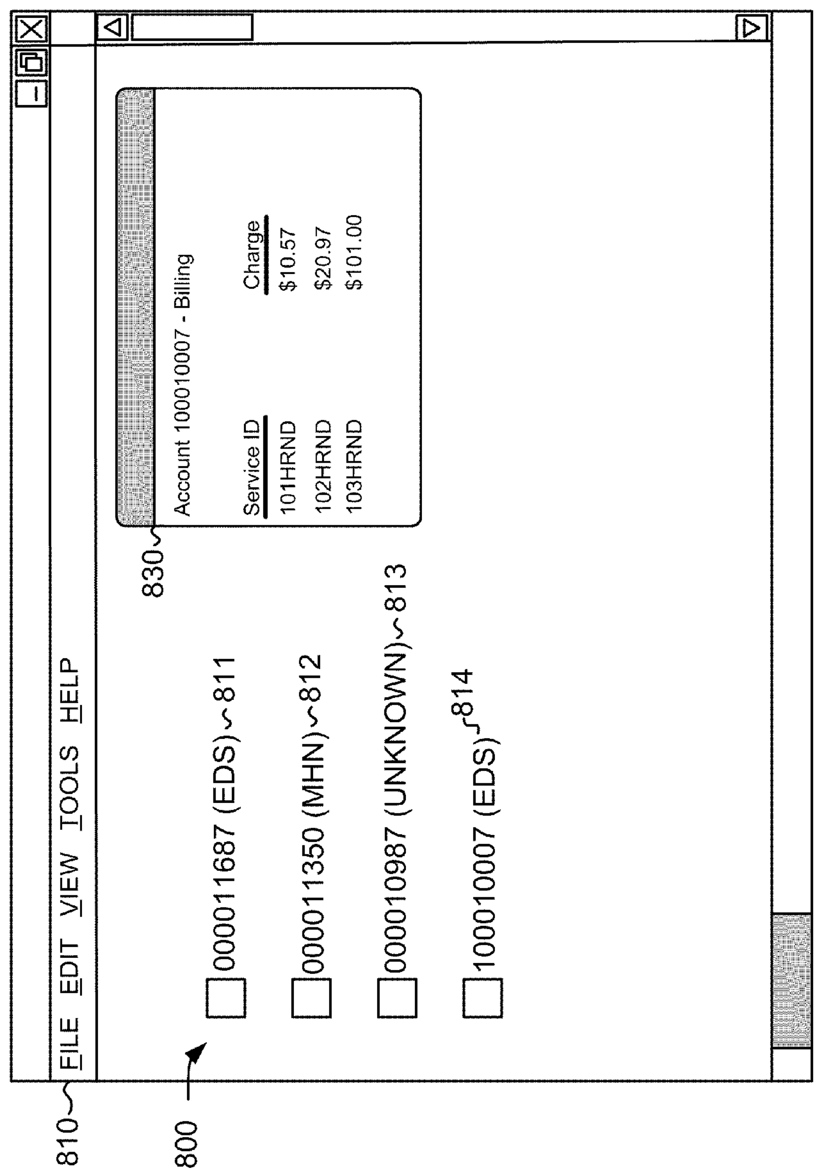
FIG. 8 is a diagram illustrating an exemplary rendered version of a web page returned to a client by a web server.

The account related information returned to web server 310 may be used to form a web page that may then be sent to a client (e.g., one of clients 115/116). FIG. 8 is a diagram illustrating an exemplary rendered version of a web page returned to a client by web server 310. More specifically, as shown in FIG. 8, a web browser that includes a browser window 810 may render web page 800. References 811 through 814 in web page 800 may be displayed to the user as different strings that identify different accounts that the user may select. If it is assumed that the user has selected the account indicated by reference 814, in response, the acts shown in FIG. 4 may be performed to obtain appropriate account information for this account. Web server 310 may, for example, return account information that is displayed in a pop-up window 830. In this example, the account indicated by reference 814 is a billing account and pop-window 830 displays billing information. As another example, web server 310 and middleware component 320 may, when initially returning web page 800 to client 115/116, perform the acts shown in FIG. 4 for each of the accounts in the web page. The routing information for each account may then be embedded in web page 800. For example, the routing information for the account corresponding to reference 811 may be visible to the user when the user "mouses over" reference 811.

Systems and methods described herein provide a flexible pattern matching technique for determining routing information that identifies a back-end system relating to a request. In contrast to existing approaches, such as those based on hard-coded rules to determine the routing information, failures to determine the correct routing information may act as learning opportunities for subsequent attempts. Accordingly, the system may adapt to changes in the topology of the back-end systems.

The foregoing description provides illustration and description, but is not intended to be exhaustive or to limit the embodiments to the precise form disclosed. Modifications and variations are possible in light of the above teachings or may be acquired from practice of the invention.

For example, while a series of acts has been described with regard to the flowchart of FIG. 4, the order of the acts may differ in other implementations. Further, non-dependent acts may be performed in parallel.

Embodiments, as described above, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" or as a "component" that performs one or more functions. This logic or component may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method comprising:

receiving, at the computer, first values associated with a set of parameters relating to a client request;

locating, by the computer and using the first values, second values in a table of values relating to previous client requests, the second values being more similar to the first values than any other values in the table;

identifying, by the computer, a back-end system corresponding to the second values;

attempting, by the computer, to access the identified back-end system;

determining, by the computer, whether the attempt to access the identified back-end system is successful; and storing, in a memory associated with the computer, an indication of whether the attempt to access the identified back-end system is successful.

2. The method of claim 1, where the values in the table include success counter values and failure counter values.

3. The method of claim 1, where storing the indication of whether the attempt to access the identified back-end system is successful comprises:

incrementing a success counter value of the second values when the attempt to access the identified back-end system is successful.

4. The method of claim 1, where storing the indication of whether the attempt to access the identified back-end system is successful comprises:

incrementing a failure counter value of the second values when the attempt to access the identified back-end system is not successful.

5. The method of claim 1, further comprising:

locating third values in the table when the attempt to access the identified back-end system is not successful; and identifying a second back-end system corresponding to the third values; and attempting to access the identified third back-end system.

6. The method of claim 1, where the values, in the table of values, include priority values.

7. The method of claim 6, where locating the second values includes locating the second values based on the priority values.

8. The method of claim 2, where locating the second values includes locating the second values based on the success counter values and the failure counter values.

9. A system comprising:

a memory to store sets of values associated with sets of parameters relating to client requests;

a processor to:

receive a first set of values associated with a first set of parameters relating to a first client request, access the memory to locate a second set of values that is more similar to the first set of values than other of the sets of values, determine a back-end system corresponding to the second set of values, and attempt to access the back-end system.

10. The system of claim 9, where values of the sets of values include success counter values and failure counter values.

11. The system of claim 9, where the processor is further to:

determine that the attempt to access the back-end system is successful, and increment a success counter value associated with the second set of values when the attempt to access the back-end system is successful.

12. The system of claim 9, where the processor is further to:

determine that the attempt to access the back-end system is not successful, and increment a failure counter value associated with the second set of values when the attempt to access the back-end system is not successful.

13. The system of claim 9, where the processor is further to:

locate a third set of values in the memory when the attempt to access the back-end system is not successful; and determine a second back-end system corresponding to the third values; and attempt to access the third back-end system.

14. The system of claim 9, where values of the sets of values include priority values.

15. The system of claim 14, where, when accessing the table to locate the second set of values, the processor is to locate the second set of values based on the priority values.

16. The system of claim 10, where, when accessing the table to locate the second set of values, the processor is to locate the second set of values based on the success counter values and the failure counter values.

17. A non-transitory computer-readable medium storing instructions, the instructions comprising:

one or more instructions that, when executed by one or more processors, cause the one or more processors to:

receive a first set of values associated with a first set of parameters relating to a first client request, access the memory to locate a second set of values that is more similar to the first set of values than other of the sets of values, determine a back-end system corresponding to the second set of values, and attempt to access the back-end system.

18. The non-transitory computer-readable medium of claim 17, where values of the sets of values include success counter values and failure counter values.

19. The non-transitory computer-readable medium of claim 17, where the instructions further include:

one or more instructions that cause the one or more processors to:

determine that the attempt to access the back-end system is successful, and increment a success counter value associated with the second set of values when the attempt to access the back-end system is successful.

20. The non-transitory computer-readable medium of claim 17, where the instructions further include:

one or more instructions that cause the one or more processors to:

determine that the attempt to access the back-end system is not successful, and increment a failure counter value associated with the second set of values when the attempt to access the back-end system is not successful.

* * * * *